(12) United States Patent
Tokumoto (10) Patent No.: US 11,599,303 B2
(45) Date of Patent: Mar. 7, 2023

(54) INFORMATION PROCESSING APPARATUS USING NONVOLATILE SEMICONDUCTOR MEMORY DEVICE AND CONTROL METHOD THEREFOR

(71) Applicant: CANON KABUSHIKI KAISHA, Tokyo (JP)

(72) Inventor: Yoko Tokumoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 159 days.

(21) Appl. No.: 16/924,271

(22) Filed: Jul. 9, 2020

(65) Prior Publication Data

US 2021/0019090 A1 Jan. 21, 2021

(30) Foreign Application Priority Data

Jul. 19, 2019 (JP) .............................. JP2019-133752

(51) Int. Cl.
*G06F 12/02* (2006.01)
*G06F 3/06* (2006.01)
*G06F 8/654* (2018.01)
*G06F 9/4401* (2018.01)

(52) U.S. Cl.
CPC .......... *G06F 3/0659* (2013.01); *G06F 3/0607* (2013.01); *G06F 3/0679* (2013.01); *G06F 8/654* (2018.02); *G06F 9/4401* (2013.01)

(58) Field of Classification Search
CPC .... G06F 3/0605; G06F 3/0607; G06F 3/0659; G06F 3/1225; G06F 3/123; G06F 9/4401; G06F 8/65; G06F 8/654; G06F 8/656; G06F 8/658; G06F 8/66; G06F 12/0246; G06F 12/0284

USPC ..... 711/103, E12.006–E12.012; 365/185.33; 717/168, 172, 173, 177, 178
See application file for complete search history.

(56) References Cited

U.S. PATENT DOCUMENTS

| 10,732,863 | B2* | 8/2020 | Kodera ................... G06F 3/064 |
| 2004/0186947 | A1* | 9/2004 | Nagata ................ G06F 12/1433 |
| | | | 711/E12.1 |
| 2007/0055970 | A1* | 3/2007 | Sakuda ...................... G06F 8/65 |
| | | | 717/168 |
| 2015/0058527 | A1* | 2/2015 | Venkata .............. G06F 12/0864 |
| | | | 711/128 |
| 2020/0380116 | A1* | 12/2020 | Gentili .................... G06F 13/28 |

FOREIGN PATENT DOCUMENTS

| JP | 2013097515 | A | * | 5/2013 |
| JP | 6289128 | B2 | | 3/2018 |

* cited by examiner

*Primary Examiner* — Ilwoo Park
(74) *Attorney, Agent, or Firm* — Rossi, Kimms & McDowell LLP (57) ABSTRACT

An information processing apparatus that is capable of improving access to a nonvolatile semiconductor memory. The information processing apparatus includes a nonvolatile semiconductor memory that includes memory areas, a user interface that can accept a user operation, a memory device that stores a set of instructions, and one or more processor that executes the set of instructions to generate an erase command that instructs the semiconductor memory to execute an erasing process to each of the memory areas in a state where a user operation to the user interface is unacceptable.

15 Claims, 7 Drawing Sheets

| PARTITION | NORMAL START MODE | UPDATE START MODE |
|---|---|---|
| std FIRMWARE STORAGE AREA | READ ONLY (RO) | READ AND WRITE (RW) |
| safe FIRMWARE STORAGE AREA | READ AND WRITE (RW) | READ ONLY (RO) |
| USER DATA STORAGE AREA a | READ AND WRITE (RW) | – |
| USER DATA STORAGE AREA b | READ AND WRITE (RW) | – |
| WORK AREA a | READ AND WRITE (RW) | – |
| WORK AREA b | READ AND WRITE (RW) | – |

INFORMATION PROCESSING APPARATUS USING NONVOLATILE SEMICONDUCTOR MEMORY DEVICE AND CONTROL METHOD THEREFOR

BACKGROUND OF THE INVENTION

Field of the Invention

The present invention relates to an information processing apparatus that uses a nonvolatile semiconductor memory device and to its control method.

Description of the Related Art

In recent years, more information processing apparatuses employ nonvolatile semiconductor memory devices that use flash memories, such as an SSD (a Solid State Drive) and an eMMC (embedded Multi-Media Card), as memories. A nonvolatile semiconductor memory device is superior to other memories, such as an HDD (a hard disk drive), in points, such as an access speed and silence.

In the meantime, a nonvolatile semiconductor memory used for a nonvolatile semiconductor memory device is restricted in a rewriting frequency. Moreover, in order to write new data into a written area of a nonvolatile semiconductor memory, it is necessary to execute an erasing process for changing the area to be writable in addition to a writing process. The following counterplans are suggested against the restriction of the writing frequency. For example, a cache memory is provided in a nonvolatile semiconductor memory device so that data will be written into a nonvolatile semiconductor memory only from the cache memory. This reduces the writing frequency to the nonvolatile semiconductor memory because data is not necessarily written into the nonvolatile semiconductor memory every time when an external device writes data into the nonvolatile semiconductor memory device. Moreover, a memory controller of the nonvolatile semiconductor memory device executes distributed writing called wear leveling so as to equalize the writing frequencies of areas in units, such as blocks.

The erasing process of written data is improved by the following methods. The memory controller of the nonvolatile semiconductor memory device executes a trim process that erases unnecessary data in a target area every time when new data is written into the nonvolatile semiconductor memory. Moreover, a controller of an information processing apparatus issues a trim command that instructs the memory controller of the nonvolatile semiconductor memory device to execute the erasing process.

However, even if the above-mentioned counterplans are taken, the memory controller of the nonvolatile semiconductor memory device needs to execute the erasing process for data in a used area of the nonvolatile semiconductor memory on the basis of an erase command, such as a trim command. Then, access to a nonvolatile semiconductor memory is impossible during execution of the erasing process.

Accordingly, a process of an information processing apparatus is delayed or working speed is lowered owing to inaccessibility to a nonvolatile semiconductor memory. The technique in Japanese Patent No. 6289128 executes a trim process when a job is determined in a suspension state on the basis of a use status, such as job execution, of an information processing apparatus. And then, when the job is no longer in the suspension state the trim process is interrupted.

However, access to a nonvolatile semiconductor memory is needed for a process of an information processing apparatus not only when a job is executed. For example, when a user gives an operation to an information processing apparatus, the information processing apparatus may access a nonvolatile semiconductor memory to perform a process in response to the operation.

Then, when the user gives an operation to the information processing apparatus in a job suspension state, the information processing apparatus cannot access the nonvolatile semiconductor memory to perform a process in response to the operation until a memory controller terminates interruption of a trim process. Also in this case, the user will feel delay or will feel degradation of working speed due to inaccessibility to the nonvolatile semiconductor memory device.

SUMMARY OF THE INVENTION

The present invention provides an information processing apparatus and a control method therefor that are capable of improving access to a nonvolatile semiconductor memory.

Accordingly, a first aspect of the present invention provides an information processing apparatus including a nonvolatile semiconductor memory that includes memory areas, a user interface that can accept a user operation, a memory device that stores a set of instructions, and one or more processor that executes the set of instructions to generate an erase command that instructs the semiconductor memory to execute an erasing process to each of the memory areas in a state where a user operation to the user interface is unacceptable.

Accordingly, a second aspect of the present invention provides a control method for an information processing apparatus that executes a process using a memory that needs to execute an erasing process to each written area in addition to a writing process in order to write new data into the written area, the control method including controlling the information processing apparatus so as not to accept a user operation to a user interface that is operatable by a user for processes of the information processing apparatus; and generating an erase command that instructs the memory to execute an erasing process to each area in a state where a user operation to the user interface is unacceptable.

The present invention improves access to a nonvolatile semiconductor memory.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings. Configurations described in the following embodiments are only examples, and the scope of the present invention is not limited by the configurations described in the embodiments.

Figure 1:
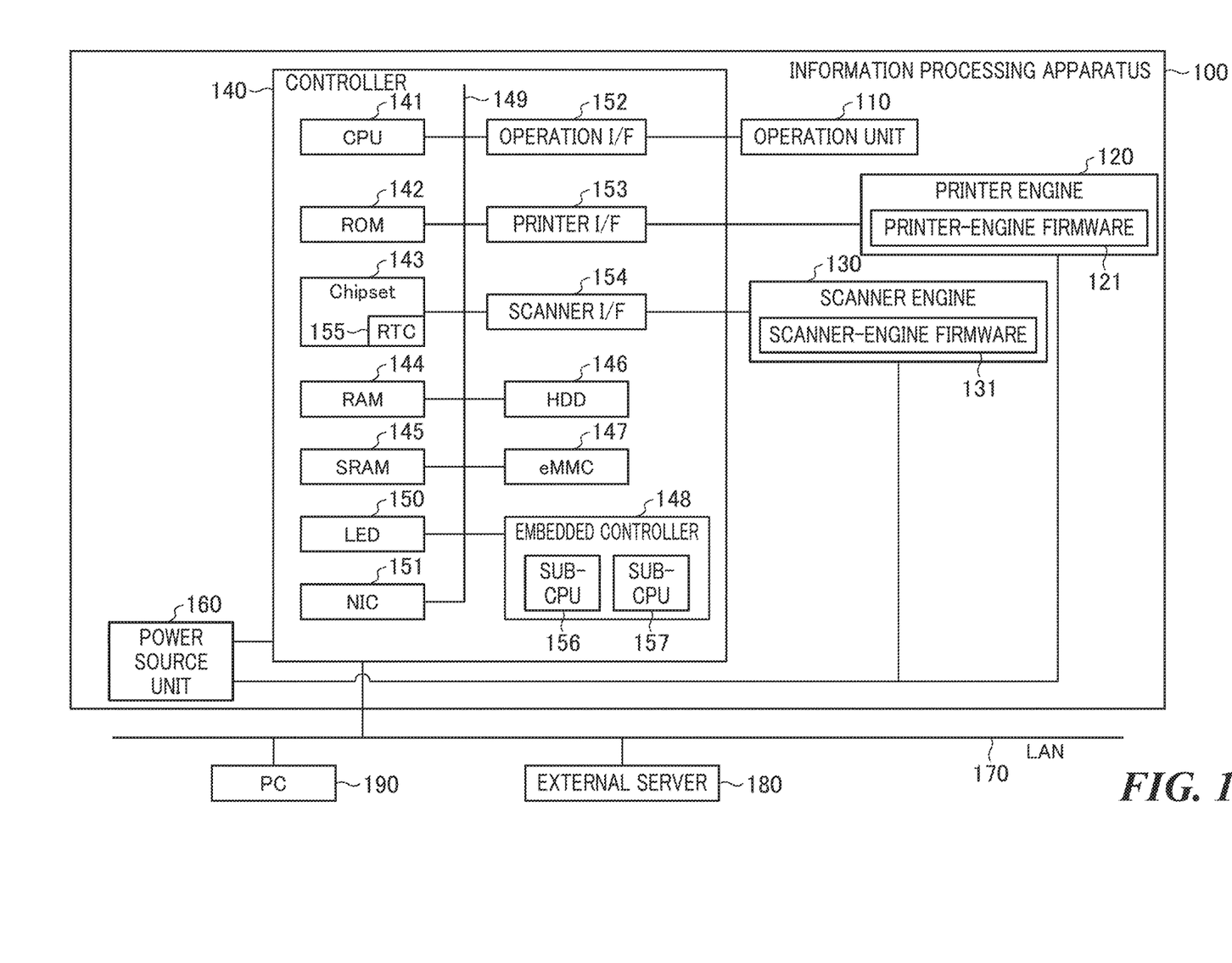
FIG. 1 is a block diagram schematically showing a configuration of an image processing apparatus according to an embodiment of the present invention.

FIG. 1 is a block diagram schematically showing a configuration of an image processing apparatus 100 according to an embodiment of the present invention. The information processing apparatus 100 of FIG. 1 has an operation unit 110, a printer engine 120, a scanner engine 130, a controller 140 to which the above units are connected, and a power unit 160. The information processing apparatus 100 of FIG. 1 is an MFP (Multi-Function Peripheral) that is able to execute a print job, scan job, and copy job. It should be noted that the information processing apparatus 100 is not restricted to an image forming apparatus like the MFP.

The power unit 160 converts commercial electric power and supplies converted power to each section of the information processing apparatus 100. In the power unit 160, a power-source controller (not shown) of the power unit 160 runs a power source firmware program stored in a ROM (not shown) to control power supply to each section. The operation unit 110 has a ten-key pad device, touch panel device, and liquid crystal device, for example.

In the operation unit 110, an operation controller (not shown) of the operation unit 110 runs an operation firmware program stored in a ROM (not shown) to control an operation of each section of the operation unit 110. Thereby, the operation unit 110 functions as a user interface that allows a user operation for a process of the information processing apparatus 100.

In the printer engine 120, a printer engine controller (not shown) runs a printer firmware program 121 stored in a ROM (not shown) to print image data to a print medium, such as a sheet. In the scanner engine 130, a scanner engine controller (not shown) runs a scan firmware program 131 stored in a ROM (not shown) to read a document and to generate image data.

The controller 140 controls operations of the entire information processing apparatus 100. The controller 140 has a CPU 141, a ROM 142, a chipset 143, a RAM 144, an SRAM 145, an HDD 146, an eMMC 147, an embedded controller 148, and a system bus 149 that mutually connects the above units. In addition, an LED 150, a network I/F (interface) card (NIC) 151, an operation I/F 152, a printer I/F 153, and a scanner I/F 154, are connected to the system bus 149.

The operation I/F 152 is connected to the operation unit 110, and inputs and outputs data with the operation units 110. The scanner I/F 154 is connected to the scanner engine 130, and inputs and outputs data with the scanner engine 130. The printer I/F 153 is connected to the printer engine 120, and inputs and outputs data with the printer engine 120.

The LED 150 displays states of the information processing apparatus 100. The states of the information processing apparatus 100 include an abnormal state of software and an abnormal state of hardware of the information processing apparatus 100, for example. The LED 150 is provided adjacent to the operation I/F 152, for example. The network I/F card 151 is connected to a LAN 170, for example. In addition, an external server 180 and a personal computer (PC) 190 are connected to the LAN 170.

The external server 180 may be connected through the Internet connected to the LAN 170. In this case, the network is constituted by the LAN 170 and the Internet. The network I/F card 151 transmits and receives data with an external apparatus, such as the external server 180, on the LAN 170. For example, data of a print job, data of an update program used for the information processing apparatus 100, and setting data are transmitted and received.

The network I/F card 151 functions as a communication module of the information processing apparatus 100. The chipset 143 is an assembly of integrated circuits that are related. The chipset 143 has a real-time clock 155, for example. The real-time clock 155 is a special integrated circuit that measures a period and time. The real-time clock 155 operates by electric power supplied from a built-in battery (not shown) even in a sleep state where the information processing apparatus 100 is inactive. The real-time clock 155 outputs a signal that starts the information processing apparatus 100 at a predetermined timing, for example.

In the meantime, the real-time clock 155 stops in a shutdown state where the information processing apparatus 100 has stopped. In this case, the information processing apparatus 100 is started by operating a switch of the power unit 160 of the information processing apparatus 100. The embedded controller 148 is an integrated circuit developed for the information processing apparatus 100. The embedded controller 148 has a sub CPU 156 and a sub RAM 157. The sub RAM 157 is used to store a program, temporary data, etc., when the CPU 141 controls the information processing apparatus 100. The sub CPU 156 runs a software program of the embedded controller 148 and performs a part of controls in the information processing apparatus 100.

Figure 2:
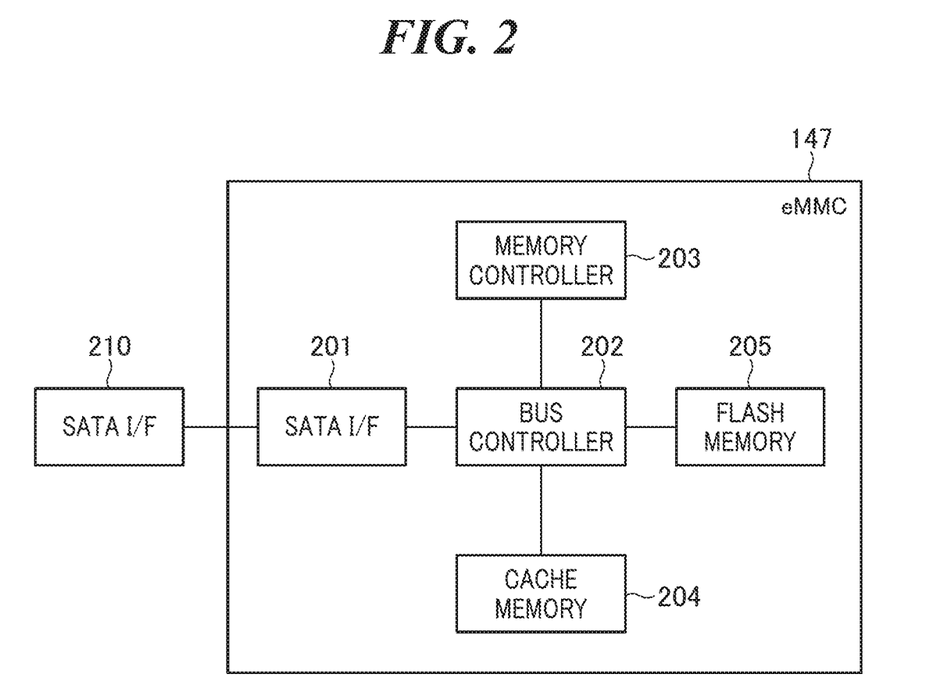
FIG. 2 is a block diagram schematically showing a configuration of an eMMC shown in FIG. 1.

The SRAM 145 stores setting values, image adjustment values, etc., of the information processing apparatus 100. The SRAM 145 is a nonvolatile memory that holds data even if the electric power is shut down until the electric power is supplied again. The HDD 146 is a mass storage device. The HDD 146 stores image data, user data, an update program for a firmware, etc. The HDD 146 may store a firmware program, for example. The eMMC 147 is a nonvolatile semiconductor memory device that has a flash memory 205 (FIG. 2). The flash memory 205 is a nonvolatile semiconductor memory. The eMMC 147 records a firmware program, a work area 304 (FIG. 3), a user data area, etc. into the flash memory 205. In addition, the eMMC 147 may record image data and user data, which would be recorded into the HDD 146 usually, into the flash memory 205 in a case where the information processing apparatus 100 is not provided with the HDD 146.

The ROM 142 stores a BIOS and a fixed setting value of the information processing apparatus 100, for example. The RAM 144 is a main memory of the CPU 141. The RAM 144 may be used as a temporary recording area, such as a work area 304. The CPU 141 reads the firmware program recorded in the eMMC 147 etc., and develops it to the RAM 144. Thereby, the CPU 141 runs the firmware program and controls operations of the entire information processing apparatus 100. The CPU 141 of the controller 140 executes processes, such as a read process and a print process, on the basis of a user operation to the operation unit 110 as a user interface. Thereby, the information processing apparatus 100 functions as an image forming apparatus and executes a print job, a scan job, or a copy job.

FIG. 2 is a block diagram schematically showing a configuration of the eMMC 147 shown in FIG. 1. As shown in FIG. 2, the eMMC 147 has an SATA I/F 201, a memory controller 203, a cache memory 204, the flash memory 205, and a bus controller 202 to which the above units are connected. An SATA I/F 210 of the information processing apparatus 100 is also illustrated in FIG. 2. The flash memory 205 is a NAND type, for example. Data in the flash memory 205 can be deleted by each unit area, such as a block. Moreover, new data cannot be written into an area in which data has been written until the data is deleted from the area of the flash memory 205.

The cache memory 204 temporarily stores data that is read from the flash memory 205 and data that will be written into the flash memory 205. The SATA I/F 201 is connected to the other SATA I/F 210 through the system bus 149. The bus controller 202 exclusively controls the data input/output between the SATA I/F 201 and the cache memory 204, and the data input/output between the cache memory 204 and the flash memory 205.

The memory controller 203 manages the eMMC 147 and controls its operation. The memory controller 203 controls the data input/output of the eMMC 147 on the basis of the SATA standard through the SATA I/F 201, for example. The memory controller 203 controls the data input/output between the cache memory 204 and the flash memory 205.

Figure 3:
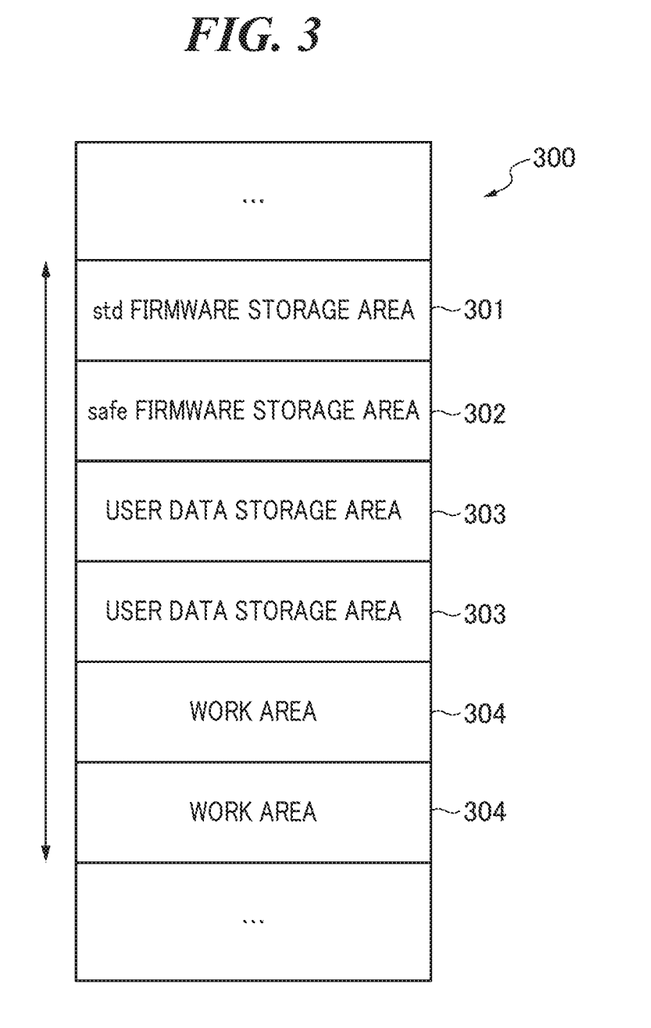
FIG. 3 is an explanatory view showing an example of a system area configured by the eMMC shown in FIG. 2.

FIG. 3 is an explanatory view showing an example of a system area 300 configured by the eMMC 147 shown in FIG. 2. FIG. 3 shows the system area 300 configured by the eMMC 147 in a case where the information processing apparatus 100 is normally started as mentioned later. The system area 300 is a recording area that is managed and accessed by the CPU 141t. The system area 300 configured by the eMMC 147 has partitions, such as a std firmware storage area (first firmware storage area) 301, a safe firmware storage area (second firmware storage area) 302, user data storage areas 303 of which the number is equal to the number of users of the information processing apparatus 100, and work areas 304.

In the case where the information processing apparatus 100 is not provided with the HDD 146, a download area 571 of a firmware update program and a temporary development area 572 mentioned later may be mounted in the system area 300 configured by the eMMC 147. In the eMMC 147, physical recording areas of the flash memory 205 are allocated to the respective partitions of the system area 300 shown in FIG. 3.

The std firmware storage area 301 stores firmware programs that the CPU 141 executes when the information processing apparatus 100 is normally started. The safe firmware storage area 302 stores firmware programs that the CPU 141 executes when the information processing apparatus 100 is started for update. The user data storage areas 303 store data for the respective users. The work areas 304 record data for the respective users when a job is executed. In this way, the firmware programs that are executable by the CPU 141 of the information processing apparatus 100 are stored in the std firmware storage area 301 and the safe firmware storage area 302 of the system area 300 shown in FIG. 3.

Figure 4:
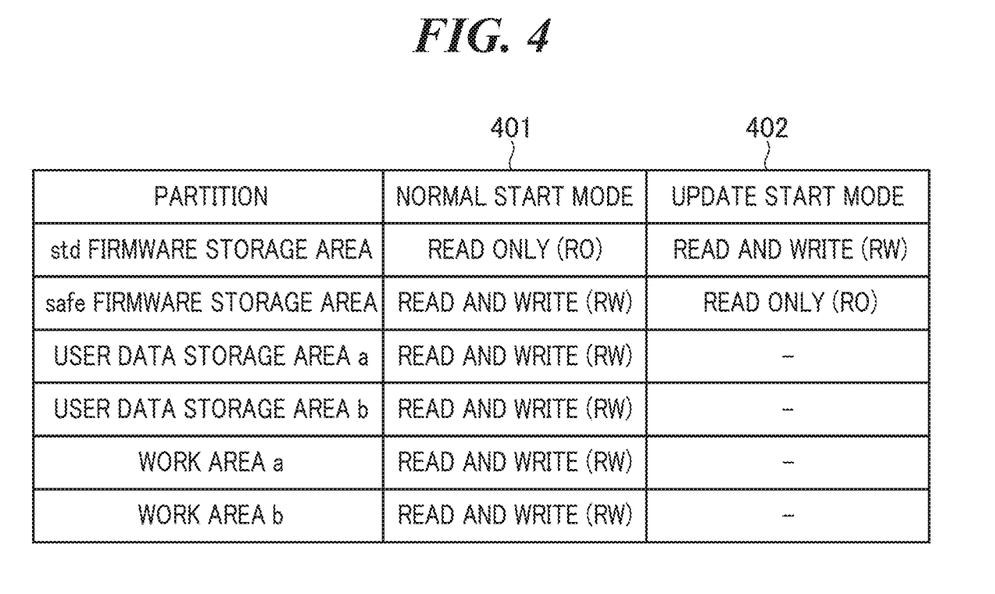
FIG. 4 is an explanatory view showing mount modes of areas of a flash memory shown in FIG. 2.

FIG. 4 is an explanatory view showing mount modes of areas of the flash memory 205. The areas of the flash memory 205 shown in FIG. 4 correspond to the areas of the system area 300 shown in FIG. 3. As shown in FIG. 4, start modes of the information processing apparatus 100 include a normal start mode 401 and an update start mode 402. When the image processing apparatus 100 is started in the normal start mode 401, the memory controller 203 of the eMMC 147 and the CPU 141 set the std firmware storage area 301, which stores programs executed in the normal startup, to a read-only (RO) mode (an unwritable mode). The safe firmware storage area 302, user data storage areas 303, and work areas 304, which are other than the std firmware storage area 301, are set to a read-write (RW) mode (a writable mode).

When the image processing apparatus 100 is started in the update start mode 402, the memory controller 203 and the CPU 141 set the safe firmware storage area 302, which stores a program executed in the startup for update, to the read-only (RO) mode. Moreover, the std firmware storage area 301 that will be updated is set to the read-write (RW) mode. The user data storage areas 303 and the work areas 304 are not mounted because these areas will not be accessed during update. In this way, the memory controller 203 of the eMMC 147 mounts the areas of the flash memory 205 to the system area 300 in mount modes corresponding to the start mode shown in FIG. 4 when the information processing apparatus 100 is started, for example. After mounting, the CPU 141 can access each area of the flash memory 205 according to each mount mode.

Figure 5:
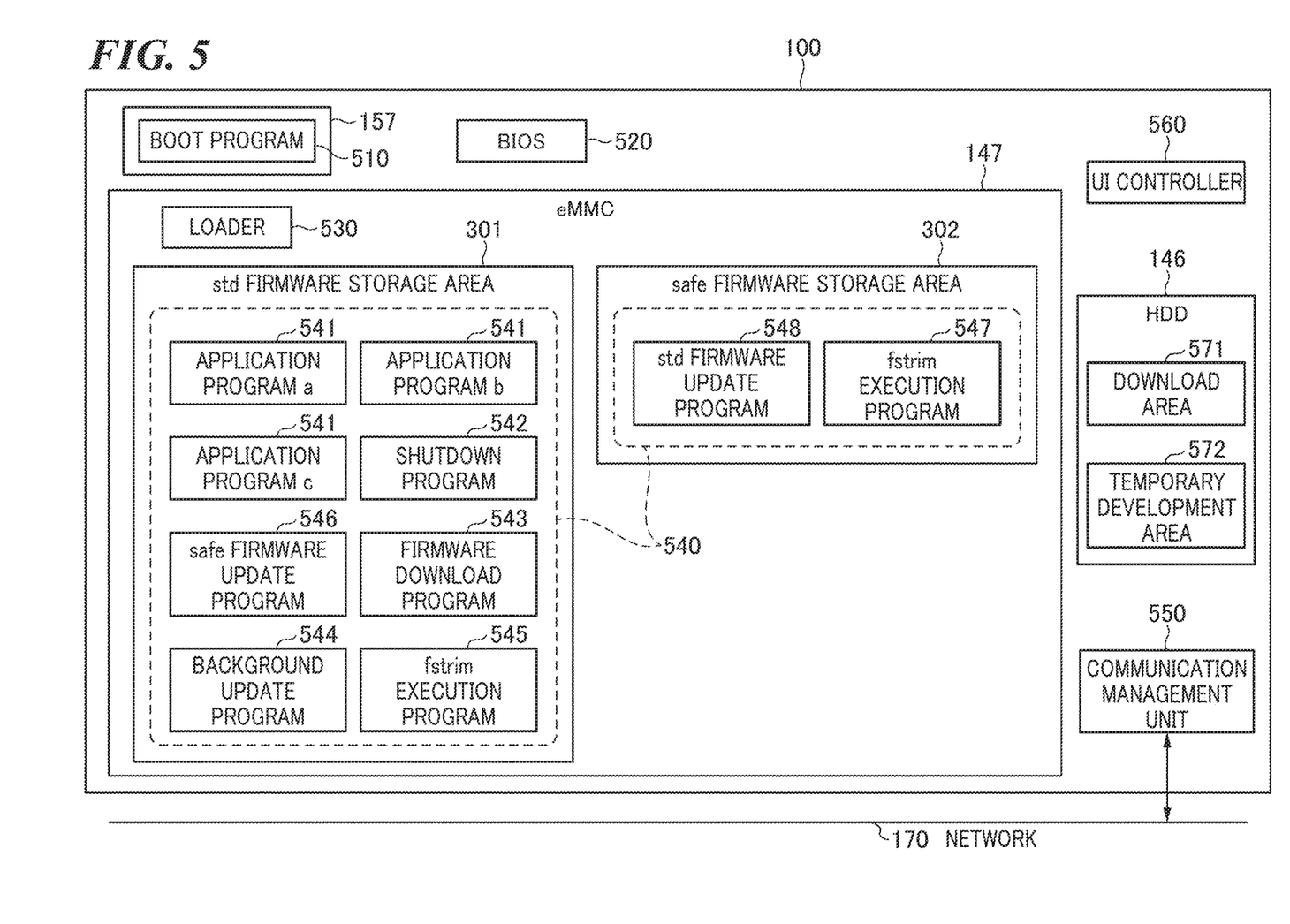
FIG. 5 is an explanatory view showing a module configuration of firmware programs of the information processing apparatus of FIG. 1.

FIG. 5 is an explanatory view showing a module configuration of the firmware programs of the information processing apparatus 100 of FIG. 1. FIG. 5 shows a boot program 510, a BIOS program 520, a loader program 530, and firmware programs 540 as programs executed in the information processing apparatus 100. The boot program 510 is stored in a memory (not shown) of the embedded controller 148.

When a seesaw switch (not shown) of the power unit 160 of the information processing apparatus 100 is turned ON, the electric power is supplied to the embedded controller 148 from the power unit 160. When the embedded controller 148 is started, the sub CPU 156 runs the boot program 510. The sub CPU 156 executes a process concerning the startup of the information processing apparatus 100. The BIOS program 520 is stored in the SRAM 145, for example.

When the sub CPU 156 runs the boot program 510, the CPU 141 reads the BIOS program 520 into the RAM 144 and runs it. The CPU 141 executes a process concerning the startup of the information processing apparatus 100. The loader program 530 is stored in the SRAM 145, for example. After running the BIOS program 520, the CPU 141 reads the loader program 530 into the RAM 144 and runs it.

Since many of the firmware programs 540 are basically executed in the normal start mode 401, they are stored in the std firmware storage area 301 of the flash memory 205 of the eMMC 147. After running the loader program 530, the CPU 141 reads a firmware program 540 into the RAM 144 and runs it. The CPU 141 executes a process concerning the startup of the information processing apparatus 100.

The firmware programs 540 stored in the std firmware storage area 301 correspond to the functions of the information processing apparatus 100. The firmware programs 540 stored in the std firmware storage area 301 include a start program for the information processing apparatus 100, control programs for the operation I/F 152, scanner I/F 154, and printer I/F 153, and application programs 541, for example.

When running a firmware program 540, the CPU 141 first reads the start program into the RAM 144 and runs it. The CPU 141 that runs the start program executes a start process that mounts the areas of the eMMC 147 and the HDD 146 that are used during the normal startup. Moreover, the CPU 141 that runs the start program reads the application programs 541 from the std firmware storage area 301 and runs them. A shutdown program 542 is one of the application programs.

When a series of executions are completed, the information processing apparatus 100 is started in a state controlled by the firmware programs 540. The information processing apparatus 100 can execute a print job etc. in response to a user operation to the operation unit 110, for example. Moreover, a communication management module 550 and UI controller 560 shown in FIG. 5 are achieved in the information processing apparatus 100. The communication management module 550 sends and receives data with the external server 180 etc. using the network I/F card 151. The UI controller 560 controls the operation unit 110 through the operation I/F 152 to display an operation screen on the operation unit 110 and obtains a user operation to the operation unit 110.

When the seesaw switch of the power unit 160 is turned OFF in the started state of the information processing apparatus 100, the CPU 141 runs the shutdown program 542 to start a shutdown process. The CPU 141 sends terminating notices to the application programs 541, for example. After confirming terminations of the application programs 541, the CPU 141 outputs a request to turn OFF the power source to the power unit 160. The power unit 160 stops supply of the power to each section of the information processing apparatus 100. Thereby, the information processing apparatus 100 enters into a stopped shutdown state.

Moreover, as shown in FIG. 5, the std firmware storage area 301 of the flash memory 205 of the eMMC 147 stores a firmware download program 543, a background update program 544, a fstrim execution program 545, and a safe firmware update program 546 that updates the safe firmware storage area 302, as parts of the firmware programs 540.

The CPU 141 repeatedly executes the firmware download program 543 that is stored in the std firmware storage area 301 executably in the state where the information processing apparatus 100 has been started normally. Thereby, the CPU 141 obtains an update program for a firmware of the information processing apparatus 100 from the external server 180 etc. The CPU 141 records the obtained update program to the download area 571 of the HDD 146.

When the update program is recorded in the download area 571 of the HDD 146, the CPU 141 runs the background update program 544. The CPU 141 develops the update program stored in the download area 571 to the temporary development area 572 of the HDD 146. Updated firmware programs 540 are recorded in the temporary development area 572 of the HDD 146. The firmware programs developed to the temporary development area 572 of the HDD 146 may include update programs for the printer firmware program 121 and scan firmware program 131. When another processing device, such as a finisher (not shown), is connected to the information processing apparatus 100, the firmware programs developed to the temporary development area 572 of the HDD 146 may include an update program for a firmware program about the other processing device.

The CPU 141 executes the safe firmware update program 546 that is stored in the std firmware storage area 301 executably and updates the safe firmware storage area 302 in the state where the information processing apparatus 100 is started normally. The CPU 141 outputs the update program developed to the temporary development area 572 of the HDD 146 to the eMMC 147 and instructs the eMMC 147 to store the update program into the safe firmware storage area 302. The memory controller 203 of the eMMC 147 updates the safe firmware storage area 302 of the flash memory 205 by the update program. The updated firmware programs 540 are recorded in the safe firmware storage area 302.

The CPU 141 may run suitably the fstrim execution program 545 stored in the std firmware storage area 301 at an arbitrary timing by the application program 541 in the state where the information processing apparatus 100 has been started normally. The CPU 141 of the controller 140 generates a fstrim command as a trim command that instructs execution of the trim process for the recording area of the flash memory 205 and outputs it to the eMMC 147.

When new data will be written into written areas of the flash memory 205 of the eMMC 147, it is necessary to execute an erasing process for each of the written areas in addition to a writing process. The memory controller 203 of the eMMC 147 executes the trim process for areas of the flash memory 205 in response to the fstrim command. Thereby, data that has become unnecessary in the information processing apparatus 100 is deleted from the area storing the data of the flash memory 205. The area from which the data has been deleted becomes a state where new data can be written. After that, the memory controller 203 of the eMMC 147 is able to execute a wear leveling process except for the area from which the data has been deleted. This reduces degradation of the performance of the eMMC 147.

It should be noted that the CPU 141 is able to register a partition of the eMMC 147 by designating a mount option called "discard" instead of generating the fstrim command when mounting the partition. In this case, when data will be written into an area of the flash memory 205 to which the mount option "discard" is set, the memory controller 203 of the eMMC 147 executes the trim process for the area into which data will be written. Thereby, the area to which the mount option "discard" is set is always maintained in a state where new data is writable. In this case, the CPU 141 does not need to generate the fstrim command during execution of the application program 541 etc. in order to execute the trim process to the area. Moreover, an operating system may not support the fstrim command. In the meantime, when the mount option called "discard" is designated to an area, the trim process is executed sequentially whenever data is written into the area. While executing the trim process, the CPU 141 cannot access the flash memory 205 of the eMMC 147. As a result, a period to be approximately needed for one writing process becomes long.

Moreover, the fstrim execution program 547 and the std firmware update program 548 that updates the std firmware storage area 301 are recorded in the safe firmware storage area 302 of the flash memory 205 of the eMMC 147 as shown in FIG. 5. The firmware programs 540 that the CPU 141 runs are divided with partitions and are recorded in the std firmware storage area 301 and safe firmware storage area 302 of the flash memory 205. Then, the std firmware storage area 301 and the safe firmware storage area 302 are mounted in the mount modes according to the start mode shown in FIG. 4.

The CPU 141 runs only the firmware programs stored in the std firmware storage area 301 during the normal startup. The CPU 141 runs only the firmware programs stored in the safe firmware storage area 302 during the startup for update. For example, the CPU 141 runs the safe firmware update program 546 that is stored in the std firmware storage area 301 and updates the safe firmware storage area 302 in the state where the information processing apparatus 100 has been started normally. Thereby, the CPU 141 updates the firmware programs stored in the safe firmware storage area 302.

Moreover, the CPU 141 runs the fstrim execution program 545 recorded in the std firmware storage area 301 in the state where the information processing apparatus 100 has been started normally. Thereby, the CPU 141 generates the fstrim command about the safe firmware storage area 302.

In the state where the information processing apparatus 100 has been started for update, the CPU 141 runs the std firmware update program 548 that is stored in the safe firmware storage area 302 and updates the std firmware storage area 301. Thereby, the CPU 141 updates the firmware programs stored in the std firmware storage area 301.

Moreover, in the state where the information processing apparatus 100 has been started for update, the CPU 141 runs the fstrim execution program 547 recorded in the safe firmware storage area 302. Thereby, the CPU 141 generates the fstrim command about the std firmware storage area 301.

Figure 6:
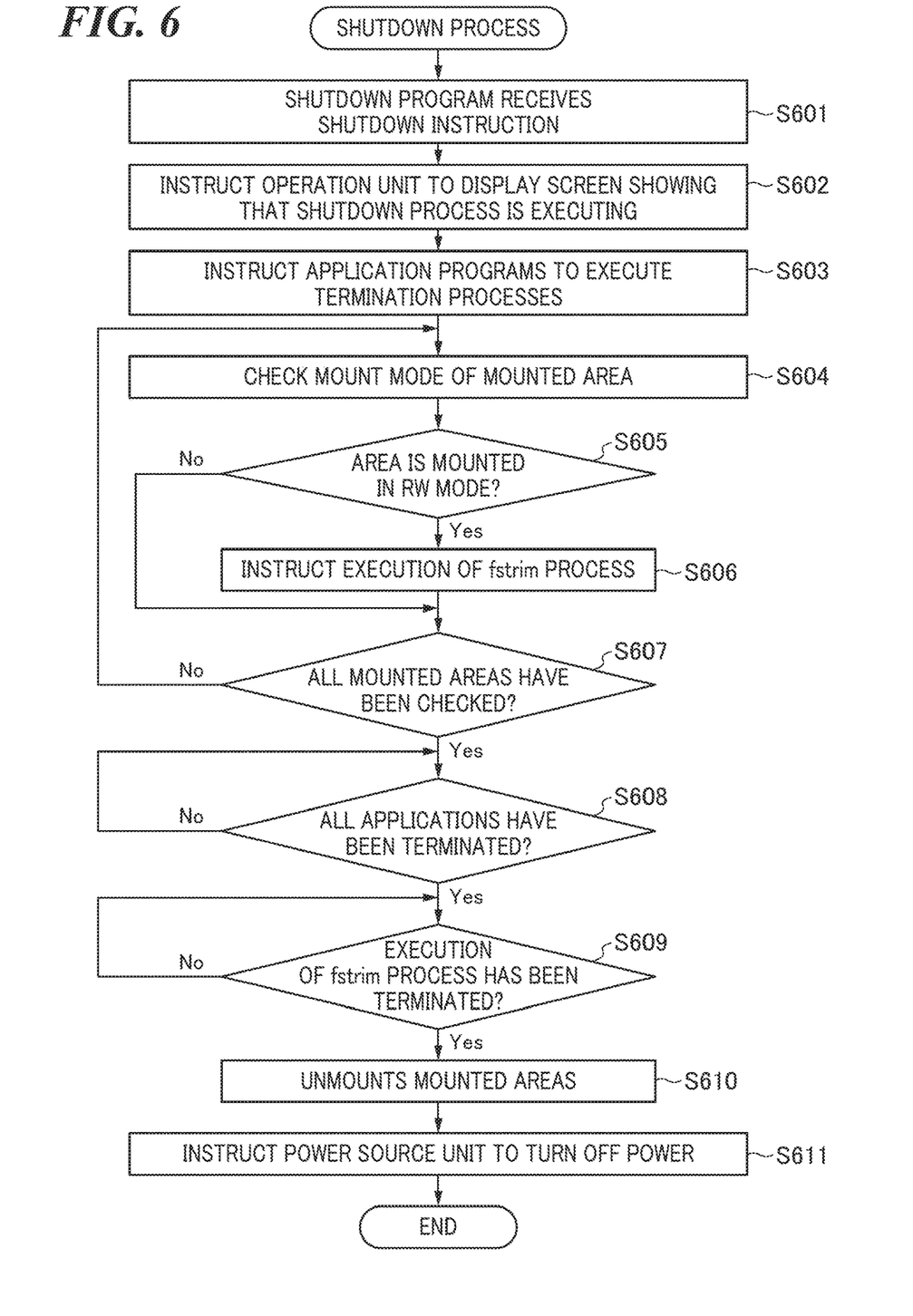
FIG. 6 is a flowchart showing a shutdown process including a trim process about the information processing apparatus of FIG. 1.

FIG. 6 is a flowchart showing a shutdown process including the trim process about the information processing apparatus 100 of FIG. 1. The CPU 141 of the information processing apparatus 100 that has been started normally runs the shutdown program 542 stored in the std firmware storage area 301 of the eMMC 147 and executes the shutdown process of FIG. 6 when terminating the information processing apparatus 100 that has started normally.

In step S601, the CPU 141 obtains a shutdown instruction due to the OFF operation of the seesaw switch of the power unit 160, a shutdown instruction sent from the personal computer 190 or the external server 180 through the network, or a shutdown instruction due to an operation to the operation unit 110. Thereby, the CPU 141 starts the shutdown process by the shutdown program 542 included in the std firmware storage area 301 of the eMMC 147.

In step S602, the CPU 141 instructs the operation unit 110 to display a shutdown screen showing that the shutdown process is executing. The operation unit 110 displays the shutdown screen. Moreover, the operation unit 110 becomes a state where a user operation is unacceptable (i.e., a state where a user operation cannot be accepted). The information processing apparatus 100 becomes the state where a user operation to the user interface that is operatable by a user for processes of the information processing apparatus 100 is unacceptable.

In step S603, the CPU 141 instructs the application programs 541 stored in the std firmware storage area 301 to terminate the programs. Thereby, the CPU 141 starts termination processes for the application programs 541. The CPU 141 cancels an active job of each of the application programs 541, saves data about a resource used, and releases the resource.

After finishing the termination processes about the application programs 541, the CPU 141 notifies the shutdown program 542 of termination. According to the process from the step S601 to the step S603, the CPU 141 becomes the state where a user operation is unacceptable and becomes a state where new jobs, such as a print job, a scan job, and a FAX job are unacceptable.

In step S604, the CPU 141 checks the mount mode of each mounted area of the eMMC 147 while waiting termination notices of the application programs. In step S605, the CPU 141 determines whether an area of the eMMC 147 is mounted in the read-write (RW) mode. Thereby, the CPU 141 of the controller 140 determines whether the area of the flash memory 205 is writable in order to generate the trim command that instruct the flash memory 205 to execute the erasing process for the area. When the determined area is mounted in the read-write (RW) mode, the CPU 141 proceeds with the process to step S606. When the determined area is not mounted in the read-write (RW) mode, the CPU 141 proceeds with the process to step S607.

In the step S606, the CPU 141 executes of the fstrim process to the area mounted in the read-write (RW) mode. The CPU 141 generates the fstrim command that instructs execution of the erasing process for the area determined to be writable and outputs it to the memory controller 203 of the eMMC 147. The memory controller 203 of the eMMC 147 executes the trim process that deletes unnecessary used data written in the target area of the flash memory 205. In the trim process, the memory controller 203 erases unnecessary data from the target area of the process, for example. Thereby, the CPU 141 executes the trim process about the flash memory 205 that needs to execute the erasing process for each written area in addition to the writing process in order to write new data into the written area.

Since the trim process deletes unnecessary used data written in an area of the flash memory 205 that is mounted in the read-write (RW) mode, the area becomes the state where new data is writable. In the step S607, the CPU 141 determines whether the mount modes of all the mounted areas of the flash memory 205 have been checked. When the mount modes of not all the mounted areas have been checked, the CPU 141 returns the process to the step S604.

The CPU 141 checks a mount mode of each mounted area of the flash memory 205 and generates the fstrim command if needed until the mount modes of all the mounted areas have been checked. When the mount modes of all the mounted areas have been checked, the CPU 141 proceeds with the process to step S608. Thereby, the used data in all the areas of the flash memory 205 that are mounted in the read-write (RW) mode are deleted, and the areas become the state where new data is writable. In the case of the normal startup shown in FIG. 4, the used data recorded in all the user data areas 303 and all the work areas 304 are deleted and new data can be written into these areas.

In the step S608, the CPU 141 determines whether all the application programs 541 have been terminated. For example, the CPU 141 determines whether termination notices have been received from all the application programs 541. When at least one of the application programs 541 has not been terminated, the CPU 141 repeats the determination process in the step S608 and waits for the termination of the at least one of the application programs. After all the application programs 541 have been terminated, the CPU 141 proceeds with the process to step S609.

In the step S609, the CPU 141 determines whether all the trim processes about the mounted areas of the flash memory 205 have been terminated. For example, when executing the process in the step S606 at the beginning, the CPU 141 sets a flag showing that the fstrim is under execution. The CPU 141 clears the flag after all the processes by the fstrim execution program 545 are terminated. In this case, the CPU 141 determines that all the trim processes have been terminated when the flag is cleared. When not all the trim processes have been terminated, the CPU 141 repeats the determination process in the step S609 and waits for the termination. When all the trim processes have been terminated, the CPU 141 proceeds with the process to step S610.

In the step S610, the CPU 141 executes unmount processes for all the areas of the flash memory 205 that have been mounted during the normal startup. In step S611, the CPU 141 instructs the power unit 160 to turn OFF the power. The power unit 160 stops supply of the power to each section of the information processing apparatus 100.

In this way, in the shutdown process of FIG. 6 of the information processing apparatus 100, the information processing apparatus 100 generates the trim command that instructs execution of the erasing process for each area after changing the state so as not to accept a user operation to the user interface. The information processing apparatus 100 is able to generate a trim command in the state where a job that the information processing apparatus 100 processes does not occur and where a user operation to a user interface is unacceptable. Thereby, the information processing apparatus 100 is able to generate a fstrim command at a timing other than timings at which a user operation and job execution may generate in the normally started state.

If job execution or a user operation occurs in the information processing apparatus 100 during the fstrim process in which the trim process is executed in the eMMC 147, the response of the eMMC 147 will be delayed. As a result, the performance of the information processing apparatus 100 is lowered. In this embodiment, it is able to control the eMMC 147 to execute the trim process without lowering the performance. Moreover, in this embodiment, it is determined whether the mount mode of each area of the flash memory 205 is the read-write mode in order to generate the trim command that instructs the flash memory 205 to execute the erasing process for each area. The trim command that instructs execution of the erasing process for each area is generated for an area of which the mount mode is determined as the read-write mode. Trim commands are not uniformly generated for all the areas of the flash memory 205. Thereby, in this embodiment, the load of the process for erasing the unnecessary data from the flash memory 205 during the shutdown process is reduced, and a time required can be shortened. The required time of the shutdown process in this embodiment does not become longer than that of the case where trim commands are uniformly generated for all the areas of the flash memory 205.

Figure 7:
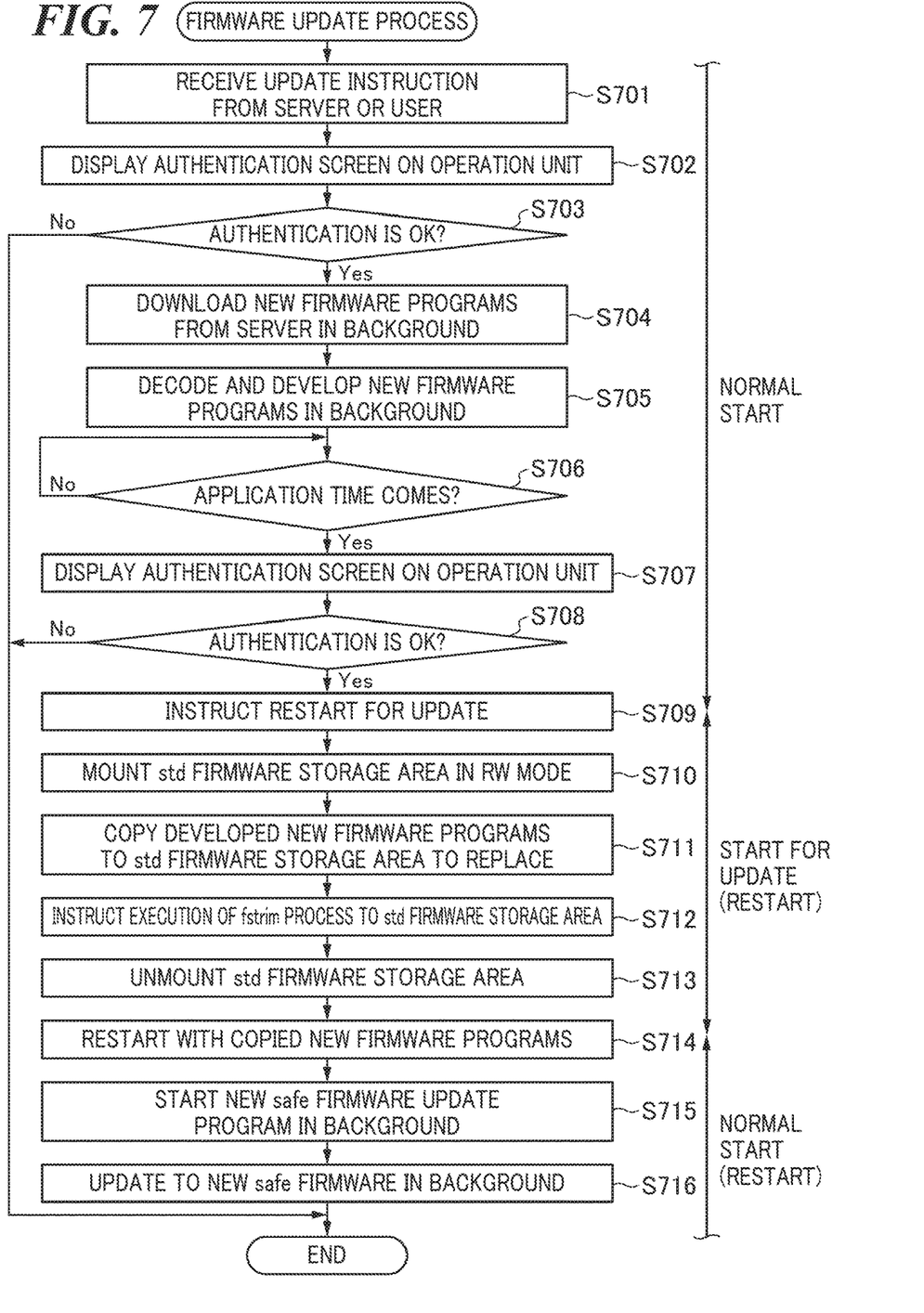
FIG. 7 is a flowchart showing a firmware-program update process including the trim process about the information processing apparatus of FIG. 1.

FIG. 7 is a flowchart showing an update process for the firmware programs 540 including the trim process about the information processing apparatus 100 of FIG. 1. The CPU 141 of the information processing apparatus 100 that has been started normally runs various kinds of execution programs for update stored in the std firmware storage area 301 of the eMMC 147 for the update process for the firmware programs 540 of the information processing apparatus 100. Thereby, the CPU 141 executes the update process of FIG. 7.

In step S701, the CPU 141 obtains an update instruction for the firmware programs 540 from the external server 180 or a user through the operation unit 110 in the normally started state. The CPU 141 instructs the firmware download program 543, which is stored in the std firmware storage area 301 of the eMMC 147, to update. Thereby, the CPU 141 runs the safe firmware update program 546 that is stored in the std firmware storage area 301 of the eMMC 147 and updates the safe firmware storage area 302. The CPU 141 obtains information about a new firmware program that is an update target, and saves the information into a firmware information storage area of the eMMC 147.

In step S702, the CPU 141 displays an authentication screen on the operation unit 110. In step S703, the CPU 141 determines user authentication. When the user is not authenticated, the CPU 141 finishes the process of FIG. 7. When the user is authenticated, the CPU 141 proceeds with the process to step S704. When the firmware update program does not need user authentication, the CPU 141 may proceed with the process to the step S704 after the step S701.

In the step S704, the CPU 141 downloads new update programs (update data) about the firmware programs 540 from the external server 180 by a background process and saves them in the download area 571 of the HDD 146. The new update programs downloaded include a firmware program 540 of a new version etc. that will be stored in the safe firmware storage area 302 of the eMMC 147. The downloaded update programs are encrypted and signed in order to prevent from falsification.

In step S705, the CPU 141 decodes the update programs downloaded to the download area 571 and develops them to the temporary development area 572 in the background. Thereby, the firmware programs 540 that should be finally developed and recorded in the eMMC 147 are beforehand developed in the HDD 146. Accordingly, the CPU 141 has only to copy the new firmware programs 540 beforehand developed to the temporary development area 572 of the HDD 146 to the predetermined area of the eMMC 147 in a later process executed after restarting the information processing apparatus 100. The downtime of the eMMC 147 for update can be shortened as compared with the case where all the decoding, development, and application processes are executed after restarting.

In step S706, the CPU 141 checks whether the application time of the firmware programs 540 comes. The application time of the firmware programs 540 is beforehand recorded in the eMMC 147 by obtaining from the external server 180 or by obtaining a user setting. When the application time of the firmware programs 540 does not come, the CPU 141 repeats the process in the step S706. When the application time of the firmware programs 540 comes, the CPU 141 proceeds with the process to step S707.

In the step S707, the CPU 141 displays the authentication screen on the operation unit 110. In step S708, the CPU 141 determines user authentication. When the user is not authenticated, the CPU 141 finishes the process of FIG. 7. When the user is authenticated, the CPU 141 proceeds with the process to step S709. When the user authentication is not needed for updating the firmware programs 540, the CPU 141 may proceed with the process to the step S709 after the step S706.

In step S709, the CPU 141 executes the restart for update. The CPU 141 executes the process from the step S601 to the step S603 and the process from the step S608 to the S610 in FIG. 6, for example, and then restarts the information processing apparatus 100 for update. The CPU 141 runs the firmware programs stored in the safe firmware storage area 302 during the restart for update. The CPU 141 runs the std firmware update program 548 that is stored in the safe firmware storage area 302 and updates the std firmware storage area 301. The safe firmware storage area 302 stores the std firmware update program 548 and the fstrim execution program 547 and does not store an application program etc. Accordingly, the CPU 141 becomes the state where a user operation to the information processing apparatus 100 is unacceptable and the state where a print job, scan job, FAX job, etc. are unacceptable because of the restart for update. In step S710 in which the information processing apparatus 100 has been restarted for update, the CPU 141 mounts the std firmware storage area 301 in the read-write (RW) mode as shown in FIG. 4 unlike in the normal startup. The CPU 141 mounts the safe firmware storage area 302 in the read-only (RO) mode as shown in FIG. 4 unlike in the normal startup.

In step S711, the CPU 141 copies the new firmware programs, which have been developed to the temporary development area 572, to the std firmware storage area 301 that is mounted in the read-write (RW) mode. The CPU 141 reads the developed new firmware programs from the HDD 146 and outputs them to the eMMC 147. The memory controller 203 of the eMMC 147 writes the new firmware programs into the std firmware storage area 301 of the flash memory 205. Thereby, the firmware programs in the std firmware storage area 301 is replaced with new ones and are updated.

In step S712, the CPU 141 applies the fstrim process to the std firmware storage area 301 that is mounted in the read-write (RW) mode. The CPU 141 runs the fstrim execution program 547 in the safe firmware storage area 302, generates the fstrim command, and outputs it to the memory controller 203 of the eMMC 147. The CPU 141 instructs the flash memory 205, which needs to execute the erasing process for each written area in addition to the writing process in order to write new data into the written area, to execute the trim process. The memory controller 203 of the eMMC 147 executes the trim process deleting data that has become unnecessary owing to the update to the instructed std firmware storage area 301 of the flash memory 205.

In the trim process, the memory controller 203 erases unnecessary data from the target area of the process, for example. Thereby, the used data in the std firmware storage area 301 of the flash memory 205 that is mounted in the read-write (RW) mode is deleted, and the std firmware storage area 301 becomes the state where new data is writable. Unnecessary data in the std firmware storage area 301 is erased in response to the trim command in the state where a user operation to the user interface is unacceptable and a job is unacceptable. Since the trim process is executed after the writing by the update of the firmware programs 540, the performance deterioration of the eMMC 147 is reduced. The CPU 141 that runs the fstrim execution program 547 notifies the std firmware update program 548 of termination of the trim process when the trim process is terminated.

In step S713, the CPU 141 unmounts the std firmware storage area 301. Moreover, the CPU 141 unmounts the safe firmware storage area 302.

In step S714, the CPU 141 restarts the information processing apparatus 100 by the normal startup. The CPU 141 runs the firmware programs stored in the std firmware storage area 301 in the restart by the normal startup. In step S715 in which the information processing apparatus 100 has been restarted by the normal startup, the CPU 141 runs the safe firmware update program 546 stored in the std firmware storage area 301 in the background.

In step S716, the CPU 141 copies the new firmware programs, which have been developed to the temporary development area 572, to the safe firmware storage area 302 that is mounted in the read-write (RW) mode in the background. The CPU 141 reads the developed new firmware program from the HDD 146 and outputs it to the eMMC 147. The memory controller 203 of the eMMC 147 writes the new firmware programs into the safe firmware storage area 302 of the flash memory 205. Thereby, the firmware programs in the safe firmware storage area 302 are replaced with new ones and are updated.

The CPU 141 does not run the firmware programs 540 stored in the safe firmware storage area 302 in the normal startup. Accordingly, the firmware programs 540 in the safe firmware storage area 302 can be updated without affecting to the operation of the information processing apparatus 100. It should be noted that the CPU 141 may instruct execution of the fstrim process to the safe firmware storage area 302 mounted in the read-write (RW) mode. The CPU 141 runs the fstrim execution program 545 in the safe firmware storage area 301, generates the fstrim command, and outputs it to the memory controller 203 of the eMMC 147. The memory controller 203 of the eMMC 147 executes the trim process deleting data that has become unnecessary owing to the update to the instructed safe firmware storage area 302 of the flash memory 205.

Moreover, the CPU 141 copies the new firmware program that has been developed to the temporary development area 572 of the HDD 146 to the safe firmware storage area 302 by the safe firmware update program 546 that is executed in the background in the normal startup shown in FIG. 7. In addition, the CPU 141 may decode and develop the new firmware program 540 downloaded and may record it into the safe firmware storage area 302 by running the safe firmware update program 546, for example.

In this way, the CPU 141 generates the trim command that instructs execution of the erasing process for each area that will be updated in the process for updating the firmware programs 540 of the information processing apparatus 100 in the process of FIG. 7. The CPU 141 generates the trim command that instructs execution of the erasing process for each area that will be updated in the state where a user operation to the user interface is unacceptable. After starting the restart for update of the information processing apparatus 100, the CPU 141 mounts the std firmware storage area 301 concerning the update of the flash memory 205 as a writable area and updates the area. Furthermore, the CPU 141 generates the trim command and instructs execution of the erasing process to erase data that becomes unnecessary owing to the update.

Although the firmware programs 540 are obtained from the external server 180 in the step S704 in the above-mentioned example, new firmware programs may be obtained by another method. For example, the similar process may be performed by connecting a USB memory or the personal computer 190 that stores the firmware programs 540. Moreover, the example that beforehand develops the new firmware programs 540 during the normal startup in the background is described as the update method of the firmware programs in this embodiment. In the meantime, the new firmware programs 540 may be developed in the normally started state for update by a program stored in the safe firmware storage area 302.

In the update process accompanied with the restart of the information processing apparatus 100, the process for restarting the information processing apparatus 100 is executed in the state of running only the programs used for the update process to the flash memory 205 in this embodiment. After that, the trim command as an erase command that instructs the flash memory 205 to execute the erasing process for each area is generated. Since the trim command is generated after the restart in the update process in this way, the trim command can be generated in the state where a job processed by the information processing apparatus 100 does not occur and a user operation to the user interface is unacceptable.

Moreover, the following processes are performed in order to generate the trim command that instructs the flash memory 205 to execute the erasing process for each area in this embodiment. That is, a recording area that will be updated of the flash memory 205 is mounted as a writable area after starting the restart for the update process of the information processing apparatus 100. Update data is copied to the recording area to replace. The trim command that instructs execution of the erasing process to each recording area is generated. And then, a restarting process is executed with the update data in the recording area. Thereby, the recording area concerning the update is used for the restart with the update data in the state where unnecessary data has been deleted by the trim command.

In this embodiment, the load of the process for erasing the unnecessary data from the flash memory 205 during the update process is reduced, and a time required can be shortened. This prevents the required time of the update process from becoming longer unnecessarily. Particularly, in this embodiment, the fstrim process is executed also to the std firmware storage area 301 at the time of update of the firmware programs in addition to the execution of the fstrim process at the time of the shutdown mentioned above. Accordingly, the trim process can be executed through the system area 300 of the eMMC 147.

Moreover, the eMMC 147 is immediately notified of an unnecessary area occurred at the time of update of the firmware programs by the fstrim process to the std firmware storage area 301 at the time of update of the firmware programs in this embodiment. Accordingly, it is expected to shorten the processing time of the fstrim process during the shutdown process performed in the normally started state.

As mentioned above, the trim command that instructs the flash memory 205 to execute the erasing processing for each area is generated in the state where a user operation to the user interface is unacceptable in this embodiment. Specifically, the trim command that instructs the flash memory 205 to execute the erasing process for each area is generated in the state where a job processed by the information processing apparatus 100 does not occur and a user operation to the user interface is unacceptable. Thereby, when a user operates the user interface, the information processing apparatus 100 prohibits execution of the erasing process to each area about the flash memory 205 that needs to execute the erasing process to each written area in addition to the writing process in order to write new data into the written area.

When a user operates the information processing apparatus 100, the flash memory 205 in the information processing apparatus 100 does not execute the erasing process to each area. Accordingly, the user becomes hard to directly feel delay and degradation of working speed based on inaccessibility to the nonvolatile semiconductor memory device. In this way, the information processing apparatus 100 improves the operability for a user while using the flash memory 205 that needs to execute the erasing process to each written area in addition to the writing process in order to write new data into the written area.

Moreover, the trim command that instructs execution of the erasing process is generated for an area that is determined as writable on the basis of a mount mode of each area of the flash memory 205 in this embodiment. Accordingly, the erasing process to each area is not executed to an area that is determined as unwritable of the flash memory 205. Accordingly, the load and required time of the erasing process are reducible on the basis of the mount mode of each area of the flash memory 205 as compared with the case where the erasing process to each area is executed to the entire flash memory 205.

Although the present invention has been described in detail on the basis of the suitable embodiments, the present invention is not limited to these specific embodiments and includes various configurations that do not deviate from the scope of the present invention.

In the above-mentioned embodiment, when updating the firmware programs 540, the CPU 141 executes the trim process only to the std firmware storage area 301 that stores the firmware programs 540. In addition, when updating the firmware programs 540, the CPU 141 may execute the trim process to an area other than the std firmware storage area 301 that stores the firmware programs 540.

In this case, the CPU 141 may mount the other area in which used data is written as a writable area after starting the restart of the information processing apparatus 100 by the update process in order to generate the trim command that instructs the flash memory 205 to execute the erasing process to each area. For example, the user data storage areas 303 and work areas 304 in the mount configuration shown in FIG. 4 may dare to be mounted in the read-write (RW) mode in the update start mode 402.

Then, the CPU 141 determines that these areas are writable on the basis of the mount modes of the respective areas and generates the trim command that instructs execution of the erasing process to each area in the step S712 in FIG. 7. Thereby, unnecessary data written in the areas of the flash memory 205 other than the std firmware storage area 301 that stores old data concerning the update can be deleted during the update process. Since the trim process deletes unnecessary used data written in an area of the flash memory 205 that is mounted in the read-write (RW) mode, the area becomes the state where new data is writable.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-133752, filed Jul. 19, 2019, which is hereby incorporated by reference herein in its entirety.

What is claimed is:

1. An information processing apparatus comprising:
   a nonvolatile semiconductor memory that includes a plurality of memory areas;
   a user interface that can accept a user operation;
   a memory device that stores a set of instructions; and at least one processor that is configured to notify of a trim command to cause the semiconductor memory to execute an erasing process for a memory area out of the plurality of memory areas, wherein the at least one processor
obtains a mount status of the memory area, and
determines, according to the obtained mount status of the memory area, whether or not to notify the semiconductor memory of the trim command targeting the memory area, wherein the at least one processor executes instructions in the memory device to determine whether or not to notify the semiconductor memory of the trim command in response to execution of a program that is used in an update process to the nonvolatile semiconductor memory and restart of the information processing apparatus, wherein the nonvolatile semiconductor memory has a first memory area that stores programs run in a normal startup of the information processing apparatus and a second memory area that stores only programs run at a time of updating the first memory area, and wherein the at least one processor executes instructions in the memory device to:
restart the information processing apparatus from a normal state to a started state for update;
update the programs stored in the first memory area in the started state for update; and
notify the semiconductor memory of the trim command to cause the semiconductor memory to execute the erasing process to the first memory area.

2. The information processing apparatus according to claim 1, wherein the at least one processor executes instructions in the memory device to, in a state where a user operation to the user interface is unacceptable, obtain the mount status of the memory area, and determines, according to the obtained mount status of the memory area, whether or not to notify of the trim command targeting the memory area.

3. The information processing apparatus according to claim 2, wherein the state where a user operation to the user interface is unacceptable is achieved in a case where the user interface has accepted an operation to execute a shutdown process that shuts down the information processing apparatus.

4. The information processing apparatus according to claim 2, wherein the state where a user operation to the user interface is unacceptable is achieved by an update process to the nonvolatile semiconductor memory accompanied with restart of the information processing apparatus.

5. The information processing apparatus according to claim 1, wherein the at least one processor executes instructions in the memory device to:
determine whether or not the obtained mount status of the memory area is a writable status; and
notify the memory area of the trim command in a case where the obtained mount status of the memory area is determined as the writable status.

6. The information processing apparatus according to claim 1, wherein the at least one processor executes instructions in the memory device to:
restart the information processing apparatus from the started state for update to the normal state; and
update the program stored in the second memory area in the normal state after the restart.

7. The information processing apparatus according to claim 1, wherein the at least one processor executes instructions in the memory device to:
mount the memory area out of the plurality of memory areas as a writable area after starting the restart by an update process of the information processing apparatus in order to generate the trim command;
copy the update data to the memory area to replace;
notify of the trim command to execute the erasing process on the memory area; and
execute a restarting process with the update data in the memory area.

8. The information processing apparatus according to claim 7, wherein the at least one processor executes instructions in the memory device to:
mount a different area from the memory area out of the plurality of memory areas as a writable area after starting the restart by the update process of the information processing apparatus in order to generate the trim command; and
generate the trim command to the different area.

9. The information processing apparatus according to claim 1, wherein
the information processing apparatus comprises an image forming apparatus that executes one or more of a print job, a scan job, and a copy job, and
the normal state is a state in which a job is able to be executed.

10. The information processing apparatus according to claim 1, wherein the at least one processor
in a case where the mount status of the memory area is not a writable status, does not notify the semiconductor memory of the trim command targeting the memory area, and
in a case where the mount status of the memory area is the writable status, notifies the semiconductor memory of the trim command targeting the memory area.

11. The information processing apparatus according to claim 1, wherein the at least one processor, in a state where a user operation to the user interface is unacceptable, obtains the mount status of the memory area, and determines whether or not to notify of the trim command targeting the memory area in accordance with the obtained mount status of the memory area.

12. The information processing apparatus according to claim 1, wherein
the plurality of memory areas include a first memory area that stores a program run in a normal startup and a second memory area that stores a program run in a startup for update,
in a state where the information processing apparatus is in a started state for a normal start, the at least one processor
obtains mount statuses of the first memory area and the second memory area,
does not notify the semiconductor memory of the trim command targeting the first memory area, of which the mount status is not a writable status, and
notifies the semiconductor memory of the trim command targeting the second memory area, of which the mount status is the writable status.

13. The information processing apparatus according to claim 12, wherein
in a state where the information processing apparatus is in a started state for update, the at least one processer
obtains mount statuses of the first memory area and the second memory area, does not notify the semiconductor memory of the trim command targeting the second memory area, of which the mount status is not a writable status, and notifies the semiconductor memory of the trim command targeting the first memory area, of which the mount status is the writable status.

14. The information processing apparatus according to claim 12, wherein the trim command is a command to execute, on a targeted area, a trim process for deleting data which is already-used and unnecessary.

15. A control method for an information processing apparatus that executes a process using a nonvolatile semiconductor memory that includes a plurality of memory areas, the control method comprising:

notifying the semiconductor memory of a trim command to cause the semiconductor memory to execute an erasing process for a memory area out of the plurality of memory areas, wherein the control method comprises, in order to notify of the trim command, obtaining a mount status of the memory area, determining, according to the obtained mount status of the memory area, whether or not to notify the semiconductor memory of the trim command targeting the memory area, and determining whether or not to notify the semiconductor memory of the trim command in response to execution of a program that is used in an update process to the nonvolatile semiconductor memory and restart of the information processing apparatus, wherein the nonvolatile semiconductor memory has a first memory area that stores programs run in a normal startup of the information processing apparatus and a second memory area that stores only programs run at a time of updating the first memory area, and wherein the control method includes executing instructions in the memory device to:

restart the information processing apparatus from a normal state to a started state for update;

update the programs stored in the first memory area in the started state for update; and notify the semiconductor memory of the trim command to cause the semiconductor memory to execute the erasing process to the first memory area.

\* \* \* \* \*